US006544386B1

(12) United States Patent
Krzysik et al.

(10) Patent No.: US 6,544,386 B1
(45) Date of Patent: Apr. 8, 2003

(54) PLY BONDED LOTION TREATED TISSUE AND METHOD FOR MAKING SAME

(75) Inventors: Duane G. Krzysik, Appleton, WI (US); Barbara S. Funk, Weyauwega, WI (US); David G. Biggs, Neenah, WI (US); Bernhardt E. Kressner, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/472,629

(22) Filed: Dec. 27, 1999

(51) Int. Cl.$^7$ ........................ D21H 27/32; D21H 17/34; B32B 33/00

(52) U.S. Cl. ........................ 162/123; 162/127; 162/134; 162/135; 162/109; 162/158; 162/172; 428/211; 428/195

(58) Field of Search ................................ 162/123, 129, 162/127, 132, 133, 117, 109, 113, 112, 134–135, 184, 158, 168.1, 164.1, 164.4, 179, 175, 172; 428/195, 537.5, 152–154, 172, 211; 156/209, 292, 324, 553, 582

(56) References Cited

U.S. PATENT DOCUMENTS

| | | | | | |
|---|---|---|---|---|---|
| 4,481,243 | A | | 11/1984 | Allen | |
| 4,513,051 | A | | 4/1985 | Lavash | |
| 4,950,545 | A | | 8/1990 | Walter et al. | |
| 5,227,242 | A | | 7/1993 | Walter et al. | |
| 5,409,572 | A | * | 4/1995 | Kershaw et al. | 162/109 |
| 5,601,871 | A | | 2/1997 | Krzysik et al. | |
| 5,650,218 | A | * | 7/1997 | Krzysik et al. | 428/195 |
| 5,693,406 | A | * | 12/1997 | Wegele et al. | 428/179 |
| 5,702,571 | A | * | 12/1997 | Kamps et al. | 162/117 |
| 5,830,487 | A | * | 11/1998 | Klofta et al. | 424/402 |
| 5,830,558 | A | * | 11/1998 | Barnholtz | 428/171 |
| 5,858,554 | A | * | 1/1999 | Neal et al. | 428/537.5 |
| 5,919,556 | A | * | 7/1999 | Barnholtz | 428/218 |
| 6,086,715 | A | * | 7/2000 | McNeil | 162/132 |
| 6,217,707 | B1 | * | 4/2001 | Garvey et al. | 162/109 |

FOREIGN PATENT DOCUMENTS

| | | |
|---|---|---|
| EP | 0264676 A1 | 4/1988 |
| WO | 9829602 | 7/1998 |

OTHER PUBLICATIONS

Abstract for AU 9898 181.

* cited by examiner

*Primary Examiner*—Jose A. Fortuna
(74) *Attorney, Agent, or Firm*—Dority & Manning, P.A.

(57) ABSTRACT

A process for producing additive composition treated multi-ply tissue products is disclosed. In accordance with the present invention, at least one (1) ply of the tissue product is treated with an additive composition, such as a lotion. Once the additive composition is applied to the tissue product, the tissue is then hot embossed by being fed through, for example, a heated bonding nip. It has been discovered that the hot embossing step improves the adhesion between the multiple plies.

34 Claims, 3 Drawing Sheets

PLY BONDED LOTION TREATED TISSUE AND METHOD FOR MAKING SAME

FIELD OF THE INVENTION

The present invention relates to tissue products. More particularly, the invention pertains to multi-ply, additive composition treated tissue products and to a method for making the products.

BACKGROUND OF THE INVENTION

Consumer tissue products such as facial tissue and bath tissue are generally used to absorb body fluids and leave the skin dry. The tissues are predominantly formed of cellulosic paper-making fibers by manufacturing techniques designed specifically to impart softness to the tissue. Despite specific efforts to select fibers and form the tissues with high levels of softness, these consumer tissue products may still have a tendency to abrade the skin.

In an attempt to reduce skin abrasion, additive compositions have been applied to the tissue. The additive compositions, sometimes generally referred to as lotions, function either to provide lubricity causing the tissue to glide across the surface of the skin, or to leave the tissue and be deposited on the skin for a skin health/cosmetic benefit. Additive compositions have been applied to tissues by techniques such as printing or spraying and at levels typically above 1 weight percent to as much as 30 weight percent, based on the weight of the tissue.

In the past, however, various problems have been experienced in constructing tissue products with lotions. For instance, lotions tend to cause multi-ply tissues to deply. It is theorized that ply bonding is impaired because these formulations contain oily, waxy, or both oily and waxy components which hinder bonding between the plies. It appears that the lotion may actually interrupt fiber-to-fiber bonding between the plies. Moreover, it is theorized that conventional mechanical ply bonding processes such as embossing and crimping are inherently ineffective for ply bonding of lotion treated tissues. Specifically, the tackiness of the lotion tends to cause the outer plies of the tissue to stick to the embossing or crimping rolls, thus separating the individual plies from one another as the tissue exits the bonding nip.

A variety of approaches have been employed over the years in an attempt to improve the ply bonding of lotion treated tissues. One approach has been to apply the lotion formulation after the tissue has been ply bonded. While this approach partially improves ply bonding, it continues to have inherent deficiencies because the mechanical forces associated with applying lotion to the tissue may disrupt the previously imparted bonds. Also, it is theorized that the oily and waxy components of the lotion may diminish fiber-to-fiber bonds even when the lotion is applied after the ply bonding operation.

A second approach that has been employed to improve ply bonding in lotion treated tissues has been to adhesively bond the plies together. Adhesive ply bonding, however, represents an added expense and tends to increase the stiffness of the multi-ply tissue.

A third approach to the problem is one disclosed in U.S. Pat. No. 4,513,051 to Lavash entitled "Tissue Paper Product" and in U.S. Pat. No. 4,481,243 to Allen entitled "Pattern Treated Tissue Paper Product" which are incorporated herein by reference. These patents disclose a method of treating a multi-ply tissue product with an emollient, where the emollient is distributed over a major portion of each surface except for the area in which the plies are crimped together. An apparent disadvantage with this approach is that a portion of the planar surface area of the tissue is void of the additive composition.

Consequently, a need still remains for a lotion treated tissue having improved ply bonding, as well as a process to provide enhanced ply bonding of multi-ply tissues that have been treated with additive compositions.

SUMMARY OF THE INVENTION

The present invention recognizes and addresses the deficiencies and drawbacks of the prior art. Accordingly, it is an object of the present invention to provide an improved additive composition-treated multi-ply tissue product.

Another object of the present invention is to provide a process for bonding at least two tissue plies together in which at least one of the plies has been treated with an additive composition.

Still another object of the present invention is to provide a hot embossing process for bonding additive composition treated tissue plies together.

In response to the above-described deficiencies associated with existing approaches to ply bonding of additive composition treated tissues, a new method for manufacturing multi-ply, additive composition treated tissue has been developed. The method allows for the manufacture of tissue products containing an additive composition and having improved ply adhesion and desirable aesthetic qualities.

Hence, one aspect of the invention relates to a method of making a tissue product. The method comprises the steps of applying an additive composition to a deposition region of at least one of a plurality of tissue plies; forming a bonding nip between a pattern roll and a backing roll, the pattern roll comprising raised bonding elements; heating at least one of the pattern roll and the backing roll to a surface temperature above ambient temperature; and transporting the plurality of tissue plies through the bonding nip such that the bonding elements compress the plurality of tissue plies in at least the deposition region.

The present inventors have discovered that when an additive composition treated tissue web is heated at the right temperature, depending on the additive composition, number of plies and the speed of the web between the embossing rolls, the additive composition melts to a liquid and intermingles with the fiber in the areas of the embossing elements. Once the tissue web exits out of the heated embossing station, the additive composition cools to a solid state with the plies bonded together. Further, adhesion of the tissue plies to the rolls is reduced, and therefore there is less force acting to separate the plies as the tissue sheet exits the bonding nip.

The pattern roll and backing roll may comprise matched steel rolls, wherein the tissue is pressed and pinched between the inter-engaging surfaces in the bonding nip. Alternatively, the backing roll may comprise a smooth steel roll, which is commonly referred to as an anvil roll. Still alternatively, the backing roll may comprise a resilient roll, which is commonly referred to as a rubber coated roll. The use of a resilient roll may be less desirable where the additive composition or the elevated temperature degrades the roll covering or where the tissue tends to adhere to the resilient roll. The pattern roll may comprise an embossing roll, a crimp roll, or other such roll having raised bonding surfaces to compress the tissue plies against the backing roll.

It should be appreciated that the terms "steel roll" and "rubber coated roll" are not specifically limited to rolls formed of steel and rubber, but rather refer to rolls having different relative surface hardnesses.

In particular embodiments, both the pattern roll and the backing roll are heated above ambient temperature. Alternatively, only one of the pattern roll and backing roll may be heated above ambient temperature. Suitable surface temperatures of the rolls may depend on a number of factors, such as the basis weight and fiber composition of the tissue web, the basis weight and formulation of the additive composition, the speed of web travel, and the like. In particular embodiments, the rolls have a surface temperature of at least about 65° C., particularly from about 65° C. (149° F.) to about 104° C. (221° F.), and more specifically from about 85° C. (185° F.) to about 95° C. (203° F.), for improved performance.

The roll or rolls may be heated by any suitable means. In particular applications, for example, a roll may be heated by a circulating supply of heated oil, water, gas, steam or the like. One or both of the rolls could alternatively be internally or externally heated by an electrical heat generating device; infrared, radiant or a conductive heat generating device; or the like. Other objects, features, and aspects of the present invention are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures in which.

Figure 1:
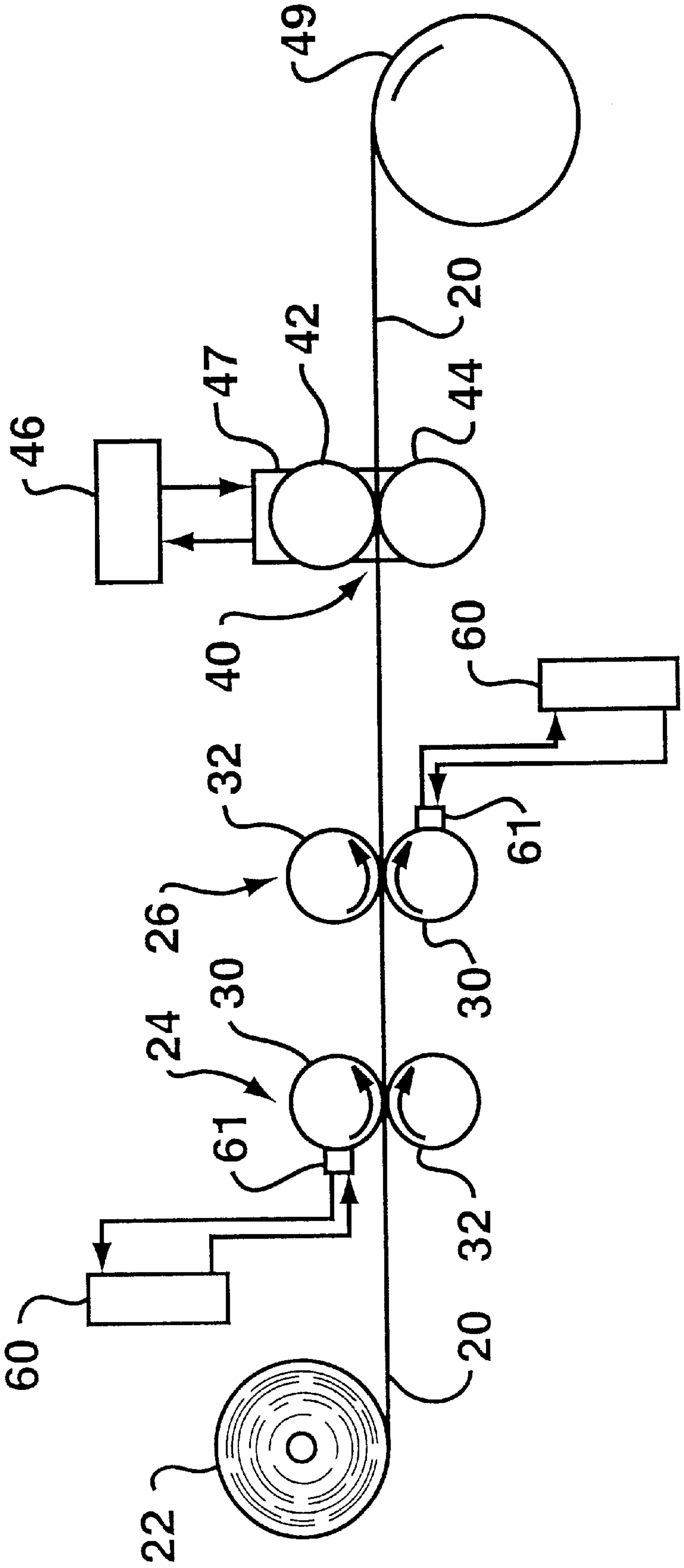
FIG. 1 is a schematic process flow diagram for a method of making a multi-ply tissue product in which a melted additive composition is consecutively printed on each outer surface of the product using a heated direct rotogravure process before the plies of the product are bonded together.

Repeat use of reference characters in the present specification and drawings is intended to represent same or analogous features or elements of the present invention.

DETAILED DESCRIPTION OF THE PREFERRED EMBODIMENTS

It is to be understood by one of ordinary skill in the art that the present discussion is a description of exemplary embodiments only, and is not intended to limit the broader aspects of the present invention which broader aspects are embodied in the exemplary construction.

In general, the present invention is directed to a process for improving adhesion between individual plies contained in a additive composition treated tissue product. The present invention is also directed to multi-ply additive composition treated tissue products that have improved integrity.

The process of the present invention generally includes the steps of applying to at least one ply of a multi-ply tissue product, an additive composition, such as a lotion. The additive composition is added to provide lubricity to the tissue and/or to provide wellness benefits by being applied to the skin of the user of the tissue. In accordance with the present invention, once the additive composition has been applied to the multi-ply tissue product, the product is embossed while the temperature of the additive composition is above it's melting point. In this manner, it has been discovered that once the additive composition cools and solidifies, the additive composition actually assists in bonding the plies together where the plies have been embossed.

In one preferred embodiment, the multi-ply tissue product is embossed by being fed through a heated bonding nip. The bonding nip can include a pattern roll and a complementary backing roll. The pattern roll can include raised bonding elements which emboss a pattern into the tissue product. In order to heat the additive composition above its melting point, the pattern roll, the backing roll, or both of the rolls can be heated.

The present invention offers many advantages and benefits over prior art constructions. In particular, the present invention provides a relatively inexpensive method for increasing the bonding strength between lotion treated tissue plies. The process of the present invention can also produce tissue products having an aesthetic look and feel produced as a result of the embossing operation.

Further, when additive composition tissues were embossed at higher temperatures an unexpected result occurred. In the area where the embossing elements crimped or embossed the tissue plies together, a translucency in those areas was obtained. However, it was also found that there is an upper temperature limit. Depending on the additive composition, number of plies and the speed of the web at certain higher temperatures, ply bonding is lost while the translucency benefit is maintained.

The multi-ply tissue products of this invention can comprise two (2) plies, three (3) plies, or more. The additive composition can be applied after the plies are brought together or prior to bringing the plies together. The individual plies can be layered or non-layered (homogeneous), creped or uncreped.

For purposes herein, "tissue sheet" refers to a single ply sheet suitable for facial tissue, bath tissue, towels, hanks, napkins, and the like having a density of from about 0.04 grams per cubic centimeter to about 0.3 grams per cubic centimeter and a basis weight of from about 4 to about 40 pounds per 2880 square feet. Tensile strengths in the machine direction can be in the range of from about 100 to about 5,000 grams per inch of width. Tensile strengths in the cross-machine direction are in the range of from about 50 grams to about 2,500 grams per inch of width.

Absorbency is typically about 5 grams of water per gram of fiber, and generally from about 5 to about 9 grams of water per gram of fiber.

The tissue sheets are preferably made from natural cellulosic fiber sources such as hardwoods, softwoods, and nonwoody species, but can also contain significant amounts of recycled fibers, sized or chemically-modified fibers, or synthetic fibers.

The additive composition can be applied to one or both surfaces of any one or more of the tissue plies. The location of the additive composition on the multi-ply tissue will depend to a great extent on the nature of the additive composition. Additive compositions which are intended to transfer to the skin of the user, for instance, are generally best positioned on the outer surfaces of the outer plies of the tissue. In one particular embodiment, for instance, the additive composition covers 100 percent of the surface area of at least one of the outer surfaces of the outer plies. As used herein, "surface area" is the planar area of the tissue web as viewed from above in a plan view; surface contours in the web are not taken into account. Alternatively, it may be advantageous to position additive compositions that do not transfer to the skin only on the inner surfaces of the outer plies and/or on the surfaces of inner plies. This may be the case, for example, for additive compositions that include an antibacterial agent.

Application of the additive composition and ply bonding may occur as part of the tissue manufacturing process, such as after the tissue is dried and prior to winding. From an efficiency standpoint, however, it is likely to be more desirable to apply the additive composition and then bond the plies together during a subsequent final tissue product converting operation. In the latter case, the application of the additive composition and the ply bonding may occur in the same or separate converting operations.

As used herein, the term "additive composition" generally refers to a chemical formulation that is added to the tissue product to provide a benefit to the consumer. More specifically, the additive composition is applied to the surface of one or more plies of a multi-ply tissue. For additive compositions of the type described herein, the amount of the additive composition is typically from about 1 to about 30 weight percent, based on the weight of the tissue product.

The additive composition may be applied by a variety of techniques, such as printing, spraying, dipping, or the like. The selection of the particular technique will depend in part on the nature of the additive composition, the type of basesheet, whether the basesheet is through-aired-dried, un-creped through-aired-dried, or conventional wet pressed, and other similar considerations.

Particularly when employing an application technique such as gravure printing, the additive composition can be applied to the surface of the tissue plies without substantially decreasing the absorbent capacity and the perceived thickness of the product relative to an untreated tissue product. When using gravure printing, the additive composition is actually present in a large number of small, spaced apart deposits on the tissue surface. These deposits thus cover only part of the surface of the tissue, in either a uniform or a non-uniform pattern. When viewed by the naked eye, the large number of small spaced-apart deposits appear to cover the entire surface, but in fact do not. The actual surface area coverage of the deposits can be from about 30 to about 99 percent, more specifically from about 50 to about 80 percent. As used herein, the term "deposition region" refers to those areas of a tissue ply that actually have the additive composition applied to them.

Gravure printing is ideally suited to such an application by providing, for example, from about 10 to about 1,000 deposits per lineal inch of surface, or from about 100 to about 1,000,000 deposits per square inch. Each deposit results from an individual cell on a printing roll, so that the density of the deposits corresponds to the density of the cells. Gravure printing encompasses several well known engraving techniques, such as mechanical engraving, acid-etch engraving, electronic engraving and ceramic laser engraving. A suitable electronic engraved example may comprise about 200 deposits per lineal inch of surface, or about 40,000 deposits per square inch. By providing such a large number of small deposits, the uniformity of the deposit distribution is very high. Also, because of the large number of small deposits applied to the surface of the tissue, the deposits more readily resolidify on the surface of the tissue where they are most effective in benefitting the user. As a consequence, a relatively low amount of the composition can be used to cover a large area.

The add-on rate is also determined by the volume of the gravure roll engraving. Typically, this is expressed in terms of the volume of the cells per square inch of engraved area. The range of liquid cell volume, described in terms of cubic billion microns (CBM) per square inch, is suitably from about 0.1 to about 15 CBM per square inch, more specifically from about 0.5 to about 10 CBM per square inch, and still more specifically from about 1.5 to about 8 CBM per square inch.

The additive composition may also be applied in a pattern of regions having different add-on amounts of the composition. For instance, one or more primary delivery regions may deliver more additive composition than the volume provided by one or more supplementary delivery regions. By way of illustration, the range of liquid cell volume for a primary delivery region, described in terms of cubic billion microns (CBM) per square inch, may be from about 0.5 to about 15 CBM per square inch, more specifically from about 1 to about 10 CBM per square inch, and still more specifically from about 1.5 to about 8 CBM per square inch. The range of liquid cell volume for a supplementary delivery region may be from 0.1 to about 10 CBM per square inch, more specifically from about 0.5 to about 8 CBM per square inch, and still more specifically from about 0.75 to about 6 CBM per square inch.

The additive composition can be water-based or oil-based. Suitable water-based compositions include, but are not limited to, emulsions and water-dispersible compositions which can contain, for example, debonders (cationic, anionic or nonionic surfactants), or polyhdroxy compounds such as glycerin, propylene glycol or polyethylene glycol. The basesheet could be treated with a bi-component system comprising a debonder and a polyhydroxy compound. Both components can be added separately or mixed together prior to being applied to the basesheet.

Oil-based compositions can include combinations of oil and wax. In particular embodiments, the tissue products are made by applying, on the surface(s) of the tissue, large numbers of individual deposits of a melted moisturizing/protective additive composition comprising a wax and an oil, and thereafter resolidifying the composition to form a distribution, of solid deposits on the surface(s) of the tissue. Because the composition is a solid at room temperature and rapidly solidifies after deposition, it has less tendency to penetrate and migrate into the sheet. Compared to tissues treated with liquid formulations, this leaves a greater percentage of the added composition on the surface of the tissue where it can contact and/or transfer to the user's skin to provide a benefit. Thus, a lower add-on amount can be used to deliver the same benefit at lower cost because of the efficient placement of the composition substantially at the surface of the product.

The additive composition may comprise solidified deposits of a composition comprising from about 30 to about 90 weight percent oil, and from about 10 to about 40 weight percent wax, preferably also containing from about 5 to about 40 weight percent fatty alcohol, said composition having a melting point of from about 30° C. to about 70° C., more specifically from about 40° C. to about 60° C. For purposes herein, "melting point" is the temperature at which the majority of the melting occurs, it being recognized that melting actually occurs over a range of temperatures.

The amount of oil in the composition can be from about 30 to about 90 weight percent, more specifically from about 40 to about 70 weight percent, and still more specifically from about 45 to about 60 weight percent. Suitable oils include, but are not limited to, the following classes of oils: petroleum or mineral oils, such as mineral oil and petrolatum; animal oils, such as mink oil and lanolin oil; plant oils, such as aloe extract, sunflower oil and avocado oil; and silicone oils, such as dimethicone and alkyl methyl silicones.

The amount of wax in the composition can be from about 10 to about 40 weight percent, more specifically from about 10 to about 30 weight percent, and still more specifically from about 15 to about 25 weight percent. Suitable waxes include, but are not limited to the following classes: natural waxes, such as beeswax and carnauba wax; petroleum waxes, such as paraffin and ceresine wax; silicone waxes, such as alkyl methyl siloxanes; or synthetic waxes, such as synthetic beeswax and synthetic sperm wax.

The amount of fatty alcohol in the composition, if present, can be from about 5 to about 40 weight percent, and more specifically from about 10 to about 30 weight percent. Suitable fatty alcohols include alcohols having a carbon chain length of $C^{14}$–$C^{30}$, including acetyl alcohol, stearyl alcohol, behenyl alcohol, and dodecyl alcohol.

In order to better enhance the benefits to consumers, additional ingredients can be used. The classes of ingredients and their corresponding benefits include, without limitation, anti-acne actives (a drug product used to reduce the number of acne blemishes, acne pimples, blackheads, and whiteheads), antifoaming agents (reduce the tendency of foaming during processing), antimicrobial actives, antifungal actives, antiseptic actives, antioxidants (product integrity), cosmetic astringents (include a tightening or tingling sensation on skin), drug astringents (a drug product which checks oozing, discharge, or bleeding when applied to skin or mucous membrane and works by coagulating protein), aiological additives (enhance the performance or consumer appeal of the product), colorants (impart color to the product), deodorants (reduce or eliminate unpleasant odor and protect against the formation of malodor on body surfaces), emollients (help to maintain the soft, smooth, and pliable appearance of the skin by their ability to remain on the skin surface or in the stratum corneum to act as lubricant, to reduce flaking, and to improve the skin's appearance), external analgesics (a topically applied drug that has a topical analgesic, anesthetic, or antipruritic effect by depressing cutaneous sensory receptors, or that has a topical counterirritant effect by stimulating cutaneous sensory receptors), film formers (to hold active ingredients on the skin by producing a continuous film on the skin upon drying), fragrances (consumer appeal), humectants (increase the water content of the top layers of the skin), natural moisturizing agents (NMA) and other skin moisturizing ingredients known in the art, opacifiers (reduce the clarity or transparent appearance of the product), skin conditioning agents, skin exfoliating agents (ingredients that increase the rate of skin cell turnover: alpha hydroxy acids and beta hydroxyacids), skin protectants (a drug product which protects injured or exposed skin or mucous membrane surface from harmful or annoying stimuli), solvents (liquids employed to dissolve components found useful in the cosmetics or drugs), sunscreens (ingredient that absorbs at least 85% of the light in the UV range at wavelengths from 290 to 320 nonometers, but transmit UV light at wavelengths longer than 320 nanometers), and surfactants (as cleansing agents, emulsifying agents, solubilizing agents, and suspending agents). In addition to these classes of ingredients, small amounts (from about 0.01 to about 20%) of oil soluble/dispersible or lipophilic materials can be easily emulsified into the formulation using anionic, cationic, nonionic and/or zwitterionic surfactants. Lipophilic materials without limitation include, silicones/organomodified silicones (protection, tissue water resistance, lubricity, tissue softness; oils (minerals, vegetable, and animal); fatty esters and the like. Powders to enhance lubricity, oil absorption, provide skin protection, astringency, opacity, etc. and microencapsulated ingredients can also be dispersed into the formulation.

The above additive composition may be applied to one or both outer surfaces of the tissue web by heating the composition to a temperature above the melting point of the composition, for instance a melting point of from about 30° C. to about 70° C., thereby causing the composition to melt. The additive is then applied at the predetermined add-on amount or amounts by desirably uniformly applying the melted composition to one or both surfaces of the tissue web in spaced-apart deposits. Thereafter, the deposits of the melted composition are resolidified. Resolidification of the deposits can occur almost instantaneously, without the need for external cooling means such as chill rolls, if the composition is heated to a temperature only slightly above or at the melting point of the composition. However, external cooling means such as chill rolls, either before or after the application of the melt, can be used if desired to accelerate resolidification. Such instantaneous resolidification tends to impede penetration of the composition into the tissue and retain it on the surface of the tissue, which is advantageous. For example, the temperature of the melted composition can advantageously be above the melting point about 10° C. or less, more specifically about 5° C. or less, and still more specifically about 2° C. or less. As the temperature of the melted composition approaches the melting point, the viscosity of the melted composition generally increases, which further enhances the tendency of the melted composition to be retained on the surface.

Surface additive compositions of the foregoing type comprising a wax and an oil are disclosed in U.S. Pat. No. 5,601,871 issued Feb. 11, 1997 to Krzysik, et al.; and International Patent Application No. PCT/US96/01297 by Krzysik. et al., which was published Aug. 15, 1996 and identified as WO 96/24723; the disclosures of which are incorporated herein by reference.

The total tissue add-on amount of the additive composition can be from about 0.5 to about 40 weight percent, more specifically from about 3 to about 15 weight percent, and still more specifically from about 5 to about 10 weight percent, based on the weight of the tissue. Where the add-on amount is separated into primary and supplementary delivery zones, the particular add-on amounts for each zone will depend upon the desired effect of the composition on the product attributes and the specific composition. Generally, though, with respect to an additive composition of the foregoing type comprising a wax and an oil, the primary add-on amount is suitably from about 1 to about 35 weight percent, more specifically from about 3 to about 15 weight percent, and still more specifically from about 4 to about 10 weight percent, based on the weight of the tissue. Moreover, the supplementary add-on amount is suitably from about 0.2 to about 28 weight percent, more specifically from about 0.5 to about 12 weight percent, and still more specifically from about 1 to about 8 weight percent, based on the weight of the tissue. Relative to one another, the supplementary add-on amount for an additive composition comprising a wax and an oil is preferably from about 0.5 to about 80 percent, more specifically from about 5 to about 70, and still more specifically from about 15 to about 50 percent, of the primary add-on amount.

The additive composition may alternatively comprise a silicone compound. Suitable silicone compounds are those silicone compounds which provide a smooth, lubricated surface feel, preferably without smearing glass. Preferably the silicone compounds are present in an aqueous emulsion and/or solution for ease in handling and processing. A wide variety of such silicone compounds are known in the art. Specific suitable silicone compositions include, without limitation, polydimethyl siloxanes; mixtures of polydimethyl siloxanes and alkylene oxide-modified polydimethyl siloxanes; organomodified polysiloxanes; mixtures of cylic and non-cylic-modified dimethyl siloxanes; and the like. Number average molecular weights are generally about 10,000 or greater. Also suitable are aqueous mixtures of tetraethoxy silane, dimethyl diethoxy silane, and ethylene oxide/dimethyl siloxane copolymer. A preferred composition contains about 5 weight percent tetraethoxy silane, about 5 weight percent dimethyl diethoxy silane, and about 2 weight percent ethylene oxide/dimethyl siloxane copolymer in water. In such silane mixtures, the ethylene oxide-dimethyl siloxane copolymer acts as a coupling agent to bind the silicone to the tissue sheet surface, thus retarding residue build-up on the contact surface and thereby reducing the greasy feeling associated with some lubricants.

Surface additive compositions of the foregoing type comprising a silicone compound are disclosed in U.S. Pat. No. 4,950,545 issued Aug. 21, 1990 and U.S. Pat. No. 5,227,242 issued Jul. 13, 1993, both to Walter, et al.; the disclosures of which are incorporated herein by reference.

The total amount of silicone solids in the tissue sheet can be from about 0.1 to about 15 weight percent, based on the finished basis weight of the tissue sheet. Preferably the amount of the silicone compound is from about 0.5 to about 3 weight percent and most preferably from about 0.7 to about 2 weight percent. Amounts below 0.1 weight percent alone provide little benefit to the facial tissue in terms of softness improvement.

Where the silicone compound is separated into primary and supplementary delivery zones, the primary add-on amount is suitably from about 0.1 to about 15 weight percent, more specifically from about 0.5 to about 10 weight percent, and still more specifically from about 0.7 to about 5 weight percent, based on the weight of the tissue. Moreover, the supplementary add-on amount of an additive composition comprising a silicone compound is suitably from about 0.05 to about 3.5 weight percent, more specifically from about 0.25 to about 1.75 weight percent, and still more specifically from about 0.35 to about 1 weight percent, based on the weight of the tissue. Relative to one another, the supplementary add-on amount for a silicone compound additive composition is preferably from about 0.5 to about 80 percent, more specifically from about 5 to about 70, and still more specifically from about 15 to about 50 percent, of the primary add-on amount.

The silicone compound can be incorporated into the facial tissue by any suitable means, including printing, spraying, dipping and the like. The silicone compound can be incorporated into the tissue sheet at any point in the tissue manufacturing process. Preferably the silicone compound is printed onto a dried tissue sheet between the base sheet manufacturing process and the final tissue product converting process. Printing provides precise control of the add-on amount of the silicone compound and places the silicone compound on the surface of the tissue to maximize its effectiveness.

Referring to FIG. 1, a method of carrying out this invention will be described in greater detail. A plurality of individual tissue plies 20 are jointly unwound from a wound roll 22 of tissue webs. The wound roll 22 would typically be produced by individually manufacturing the tissue plies and then joining multiple plies together in a separate converting operation (not shown). The unwound tissue plies 20 are fed to first and second heated rotogravure printing stations 24 and 26, each comprising an engraved roll 30 and a backing roll 32. A melted additive composition is applied to one outer surface of the plurality of tissue plies at each of the printing stations.

The tissue plies 20 are then fed into a bonding nip 40 formed between a pattern roll 42 and a backing roll 44. The pattern roll, the backing roll, or desirably both are heated to a surface temperature above ambient temperature. In the illustrated embodiment, a liquid such as oil is heated in a remote chamber 46 and continuously circulated to suitable control valving 47 to route the oil along the interior surfaces of the pattern roll and the backing roll. The resulting multi-ply additive composition tissue product 20 is wound into a roll 49 for further converting operations.

Figure 2:
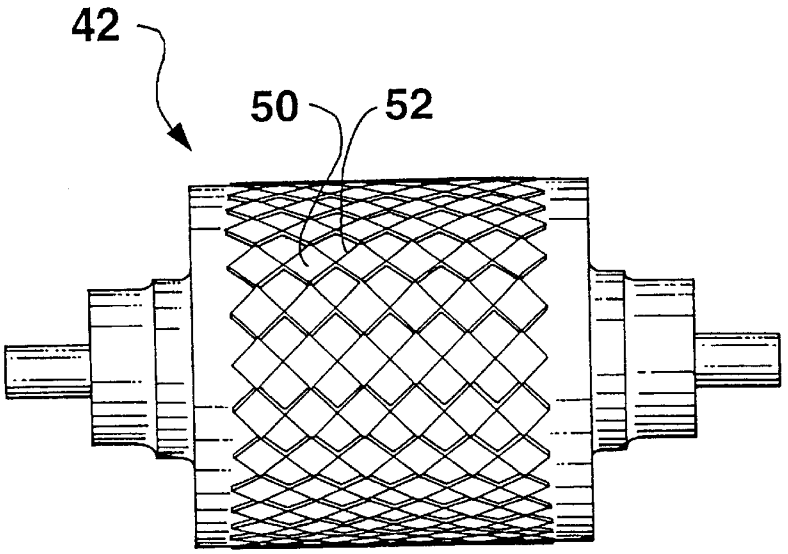
FIG. 2 representatively shows a plan view of a portion of an exemplary pattern roll used to bond the plies of multi-ply, additive composition treated tissue products.

The pattern roll 42 is shown in greater detail in FIG. 2. The surface of the pattern roll comprises bonding elements 50 that are separated by smooth land areas 52. The bonding elements are desirably arranged to form a decorative pattern on the tissue product. The pattern roll may be formed by engraving or other suitable techniques. The bonding elements are suitably raised above the surface of the land areas a distance of at least, about 0.016" and particularly from about 0.16" to about 0.018".

The backing roll 44 may comprise a steel roll matched to the pattern roll, a smooth rubber coated roll, a smooth anvil roll, or some combination thereof. The bonding nip may be set to a pattern/backing roll gap of 0 to 0.0004", such that the bonding elements compress the plurality of tissue plies together in at least the deposition region.

Figure 3:
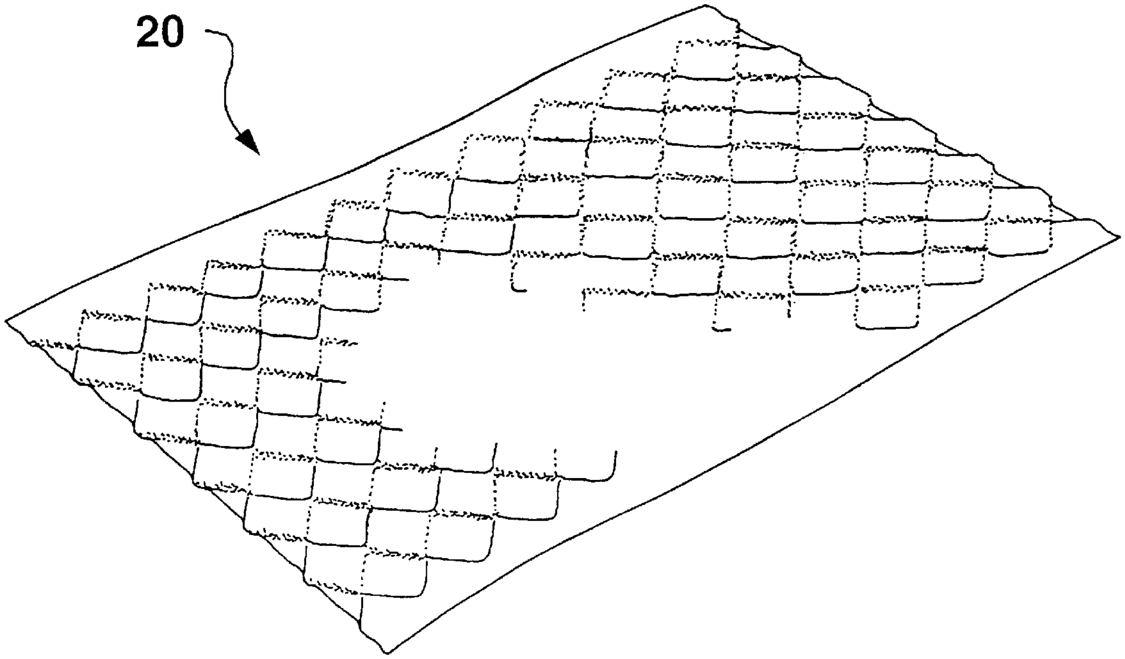
FIG. 3 representatively shows a tissue product such as would result from the manufacturing process shown in FIG. 1 and the pattern roll shown in FIG. 2.

Referring to FIG. 3, tissue product 20 made in accordance with the present invention is shown after exiting bonding nip 40.

FIG. 1 illustrates two-sided direct heated rotogravure printing of the tissue plies 20 using two printing stations 24 and 26 in series. Two-sided printing is desirable when the effect of the composition is desired on both outer surfaces of the multi-ply product. In the printing operation, the melted composition to be applied to the tissue sheet is supplied by a heated supply tank 60 and pumped to a heated doctor application head 61 by a suitable metering pump. It is desirable to maintain constant temperature in the process. Accordingly, the melted composition may be continually circulated between the supply tank and the application head while maintaining an adequate amount in the reservoir. The heated doctor applicator head supplies the melted composition to the engraved roll 30, the surface of which contains a plurality of small cells which are configured and sized to provide the transfer volume necessary to achieve the desired tactile effect.

During operation, the engraved roll 30 is loaded to the backing roll 32 to force the tissue plies into contact with the engraved roll. The backing roll can be any material that meets the process requirements such as natural rubber, synthetic rubber or other compressible surfaces. Loading pressures can vary from approximately 5–50 pounds per lineal inch (roll to roll interference) to a gravure roll/backing roll gap of about 0.008" (no roll to roll contact).

The tissue may alternatively be printed with the additive composition in an in-line process while the tissue is being manufactured or printed prior to positioning the plies together (not shown). Additionally, while the additive composition is illustrated in FIG. 1 as being applied to both outer surfaces of a multi-ply web by direct rotogravure printing, the additive composition may be applied using a variety of different approaches. The additive composition may be applied to one or both outer surfaces by any combination of direct or offset heated gravure printing, either in sequence or simultaneously, or by spraying, dipping, or the like.

Further, the additive composition may also be applied to interior surfaces or interior plies prior to bringing the plies together for bonding (not shown).

Figure 4:
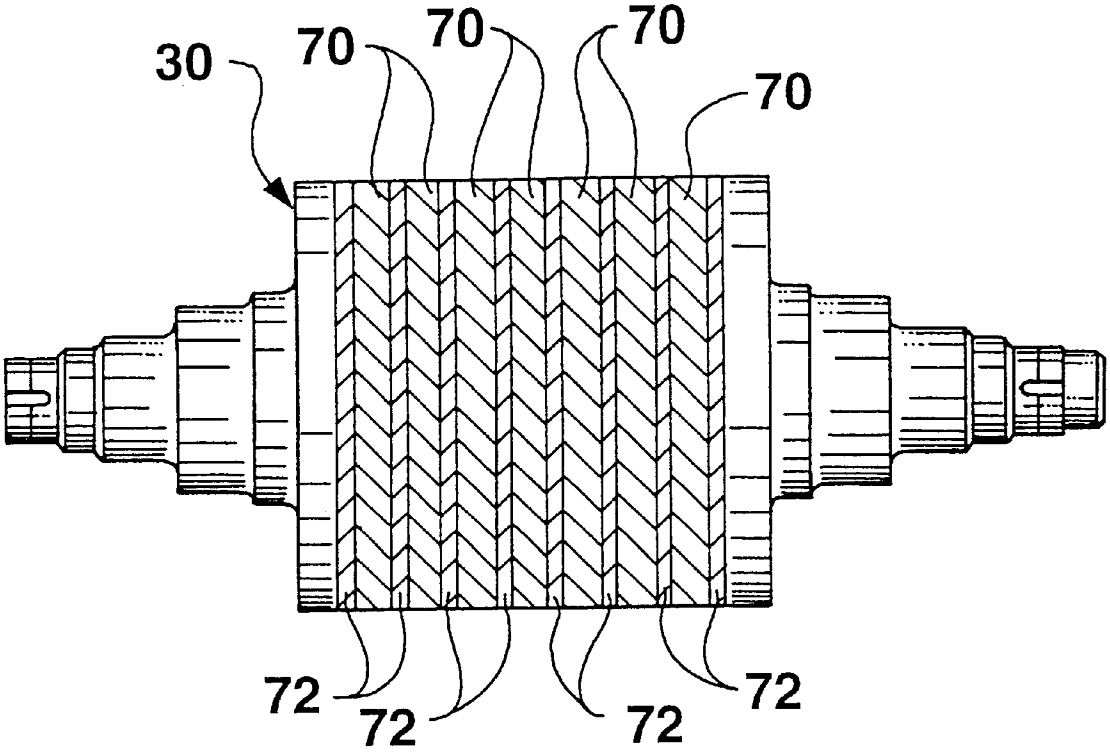
FIG. 4 representatively shows a top plan view of a portion of an exemplary engraved roll for applying an additive composition.

One exemplary engraved roll 30 suitable for applying an additive composition to facial tissue in zones of differing add-on amounts is shown in FIG. 4. The engraved roll includes an alternating pattern of two different regions of cell patterns. A plurality of primary regions 70 deliver additive deposits at approximately 2.2 gsm, and a plurality of supplementary regions 72 deliver additive deposits at approximately 0.42 gsm. The combined regions 70 and 72 in FIG. 4 have a print coverage width of approximately 8.5 inches.

The seven primary regions 70 are each approximately 0.75 inch wide, and cumulatively cover approximately 62 percent of the planar surface area of the tissue. The primary regions have a line screen of 200 cells per lineal inch. Each cell has a volume of 5.0 billion cubic microns (BCM) per square inch of roll surface, with typical dimensions of 180 microns in length, 143 microns in width, and 30 microns in depth.

The eight supplementary regions 72 are each 0.41 inch wide and cumulatively cover approximately 38 percent of the planar surface area. The supplementary regions each have a line screen of 390 cells per lineal inch. The cells in the supplementary regions have a volume of 1.5 BCM per square inch of roll surface, and typical dimensions of 110 microns in length, 65 microns in width, and 18 microns in depth.

The tissue that would result from using the engraved roll 30 of FIG. 4 would include seven distinct primary delivery zones and eight supplementary delivery zones. The supplementary delivery zones are uniformly coated with the same additive that is present in the primary delivery zone, but at a reduced amount. The placement of the supplementary delivery zones adjacent and laterally outward from the primary delivery zones maintains the benefits resulting from the primary delivery zones, but allows for a lower total add-on amount. Various arrangements for applying additive compositions in zones of differing add-on amounts are disclosed in U.S. patent application Ser. No. 08/994603 filed Dec. 19, 1997 entitled "Controlled Coverage Additive Application" and U.S. patent application Ser. No. 08/994602 filed Dec. 19, 1997 by Garvey, et al. entitled "Uncreped Through Dried Tissue with Controlled Coverage", assigned to the assignee of the present application, which are incorporated herein by reference.

REPRESENTATIVE EXAMPLES OF PRIOR ART AND INVENTION TISSUES

The heated embossing pattern's optical properties can be measured using gray level (GL), percent embossing pattern area (%Area), and bond brightness (BB) analyses. Measurements obtained from these three analyses are correlated with crimp strength data in defining the invention.

Ply Bonding Value

The ply bonding value is obtained by using the Crimp Strength Test For Ply Attachment Standard Test Procedure (STP) 814-W. This method is designed as a research tool to evaluate the ply attachment of tissue products in Peak Force in Grams. This test method quantifies ply attachment by measuring the force it takes to pull sheets apart at the crimp line or bonded area. The test evaluates only the peak force needed to separate the plies, not the total applied force. Peak Force is defined as the highest force or load generated during the time of the test.

Gray-level Analysis (GL)

The GL analysis is used to measure the overall gray value of the tissue's embossing pattern. During analysis, each pixel element of an embossing pattern image is assigned a gray value which can range from 0–63. In this 0–63 gray value range, 0 represents 'black' and 63 represents 'white'. The gray values of every image pixel are accumulated in a GL histogram. The GL histogram and the corresponding GL histogram class data can then be used to characterize the translucent nature of the embossing pattern's bond points. Gray values less than 32 represent darker shades, while values greater than 32 represent lighter shades.

The GL analysis is performed using the Leica/Cambridge, Inc. (Deerfield, Ill.) Quantimet 970 IA System and the Quantimet User Interactive Programming System (QUIPS) to provide gray level histograms typical to those known to those skilled in the art. The optical configuration and equipment used is as follows:

Camera: Chalnicon video scanner

Lens: 50 mm EL-Nikkor (f/4) with a 15 mm extension tube; no filters

Lighting: 8-bulb, octagonal ring illuminator providing high-angle, incident, omni-directional, dark-field illumination; black background (photo drape)

Macroviewer: Kreonite (Wichita, Kans.) with pole position of approx. 48.4 cm

Autostage: DCI (Franklin, Mass.) HM 1212, used as a spacer

For each tissue sample, data are acquired from a minimum of nine fields-of-view (FOV).

Percent Pattern Area Analysis (% Area)

Another factor which affects the crimp strength of an embossing pattern is the amount or percentage of area which a pattern possesses. The % area is measured over multiple FOV to arrive at a mean % area value for a specific tissue. Percent area data of the embossing and crimp patterns are acquired using a Leica, Inc. (Deerfield, Ill.) Quantimet 600 IA System and the QUIPS routine 'BONDTIS'. The BONDTIS routine is as follows:

NAME=BONDTIS

PURPOSE: TO MEASURE THE LEVEL OF BOND AREA IN TISSUE

SUBSTRATES.

AUTHOR: D. BIGGS

DATE: Aug. 6, 1998

CONDITIONS: 40 mm El-Nikkor lens (f/4) w/ 15 mm ext tube;

Pentel Coating; Angled incandescent lights; Sony 3CCD camera

TOTAREA=0

TOTFIELDS=0

AREA=0

Enter Results Header

Image Setup [PAUSE] (Camera 5, White 31.92, Black 84.03, Lamp 28.82)

Measure frame [PAUSE] (x 276, y 17, Width 256, Height 539)

FIELDS=25

CHOICE=0

For (FIELD=1 TO FIELDS, step 1)

Image Setup [PAUSE] (Camera 5, White 28.55, Black 84.03, Lamp 28.55)

Acquire (into Image0)

Detect (blacker than 110, from Iamge0 into Binary0)

Binary Amend (Open from Binary0 to Binary1, cycles 4, operator Disc, edge erode on)

Binary Amend (Close from Binary 1 to Binary2, cycles 7, operator Disc, edge erode on)

Binary Edit [PAUSE] (Draw from Binary2 to Binary3, nib Fill, width 2)

Measure field (plane Binary3)

Selected parameters: Area, Count, Area Fract, Area % Field Histogram #1 (Y Param Number, X Param Area % from 0. To 30., linear, 15 bins)

Display Field Histogram Results (#1, horizontal, differential, bins+graph (Y axis linear), statistics) Data Window (31, 643, 703, 385)

Measure Feature (plane Binary3, 8 ferets, minimum area: 8, grey image: Image0)

Selected parameters: Area, X FCP, Y FCP

AREA=Field Sum of (PAREA(FTR))

TOTAREA=TOTAREA+AREA

TOTFIELDS=TOTFIELDS+1

Feature Histogram #1 (Y Param Number, X Param Area, from 100.

To 700000., logarithmic, 15 bins)

Input (CHOICE)

If (CHOICE=1)

Goto PRINTER

Endif

Next (FIELD)

PRINTER:

Set Print Position (8 mm, 8mm)

Print Results Header

Print ("% AREA VS. FIELD COUNT", no tab follows)

Print Line

Print Field Histogram Results (#1, horizontal, differential, bins+graph (Y axis linear), statistics)

Print ("Total Area (sq. um)=", no tab follows)

Print (TOTAREA, 2 digits after '.', no tab follows)

Print Line

Print Feature Histogram Results (#1, horizontal, differential, bins+graph (Y axis linear), statistics)

Set Image Position (left 134 mm, top 212 mm, right 190 mm, bottom 256 mm, Aspect=Image Frame, Caption:Bottom Centre, "A REPRESENTATIVE SAMPLE IMAGE") Grey Util (Print Image0)

END

Tissues are mounted on ¼" thick glass plates and coated with a 50/50 mixture of n-butanol and PENTEL® Correction Fluid prior to analysis. The coating is applied to minimize stray light refraction from surface fibers. Data are acquired from a minimum of five FOV. The optical configuration and equipment used is as follows:

Camera: SONY® 3CCD Video (red gun)

Lens: 40 mm EL-Nikkor (f/4) with a 15 mm extension tube; no filters

Lighting: Four, highly angled (<30 degrees from sample plane), incandescent flood lamps Macroviewer: Kreonite® (Wichita, Kans.)

Autostage: DCI (Franklin, Mass.) HM 1212

Bond Brightness Analysis (BB)

In addition to measuring optical properties via GL analysis, optical properties of individual embossing pattern bond points are measured using BB analysis. BB is a measure of the 'whiteness' or 'blackness' of the bonds created during embossing. BB values can range from 0 (black)–255 (white). BB values and bond translucence properties are inversely proportional.

BB and % area measurements are both used in calculating Integrated Optical Density (IOD) values (IOD=% area× (255-bb)). The IOD parameter is another way to measure the overall contributions of BB and % area to the optical properties of embossing patterns.

Bond brightness data are also acquired using the Quantimet 600 IA System and the QUIPS routine 'BONDBRTE'. The BONDBRTE routine is as follows:

NAME=BONDBRTE

PURPOSE=MEASURES GREY-SCALE BRIGHTNESS OF BONDS CREATED BY EMBOSSING

CONDITIONS=Sony 3CCD; 40 mm El-Nikkor w/20 mm ext. tube; 4 floods; Black background; glass cover plate DATE=Sep. 18, 1998

AUTHOR=D. G. Biggs

FINISH=0

FIELDS=100

Enter Results Header

Image Setup [PAUSE] (Camera 5, White 51.26, Black 91.48, Lamp 22.32)

Image frame (x0, y0, Width 736, Height 574)

Measure frame (x32, y61, Width 676, Height 512)

Calibrate (CALVALUE CALUNITSS per pixel)

For (FIELD=1 TO FIELDS, step 1)

IMAGE ACQUISION AND DETECTION

Image Setup (Camera 5, White 51.26, Black 91.48, Lamp 22.32)

Acquire (into Image0)

Detect (blacker than 120, from Image0 into Binary0 delineated)

IMAGE PROCESSING

Binary Amend (Open from Binary0 to Binary1, cycles 4, operator Disc, edge erode on)

Binary Amend (Close from Binaryl to Binary2, cycles 3, operator Disc, edge erode on)

Binary Edit [PAUSE] (Reject from Binary2 to Binary3, nib Fill, width 2)

MEASUREMENT OF BOND AREAS

Measure feature (plane Binary3, 8 ferets, minimum area: 8,grey image;Image0)

Selected parameters: X FCP, Y FCP, MeanGrey

Feature Histogram#1 (Y Param Number, X Param MeanGrey, from 0. To 255., linear 25 bins)

Display Feature Histogram Results (#1, horizontal, differential, bins+graph (Y axis linear), statistics) Data Window (729, 159, 548, 852)

Display Feature Results (x 16, y 635, w 544, h 375)

PauseText ("ENTER '1' IF YOU WANT TO QUIT AND PRINT DATA.")

Input (FINISH)

If (FINISH=1)

Goto PRINT

Endif

PauseText ("SELECT A NEW FIELD-OF-VIEW")

Image Setup [PAUSE] (Camera 5, White 51.26, Black 91.48, Lamp 22.32)

Next (FIELD)

DATA OUTPUT

PRINT:

Print Results Header

Print ("FEATURE COUNT VS. MEAN GREY LEVEL", tab follows)

Print Line

Print Feature Histogram Results (#1, horizontal, differential, bins+graph (Y axis linear), statistics)

Set Image Position (left 87 mm, top 132 mm, right 174 mm, bottom 200 mm, Aspect=Image Frame, Caption:Bottom Centre, "A REPRESENTATIVE FIELD-OF-VIEW") Grey Util (Print Image0)

END

The optical configuration used is as follows:

Camera: SONY® 3CCD Video (red gun)

Lens: 40 mm EL-Nikkor (f/4) with a 20 mm extension tube; no filters

Lighting: Four floods, dark-field illumination; black background (photo drape); ¼" glass cover plate Macroviewer: Kreonite® (Wichita, Kans.)

Autostage: DCI (Franklin, Mass.) HM 1212

Data accumulated from a minimum of 90 bond points.

Integration of Data From All Methods

GL pixel data in the 24–32 gray value range are 'normalized' by multiplying these values by the tissue's % area.

EXAMPLES

Various conventional multi-ply, lotion treated tissue products were tested as described above in comparison to multi-ply, lotion treated tissue products made in accordance with the present invention. In the examples which follow, each multi-ply tissue tested was treated with the following lotion composition:

| weight % | ingredient |
|---|---|
| 59.9 | mineral oil |
| 18.0 | cerasin |
| 18.0 | steryl alcohol |
| 1.0 | dimethicone (100 cSt) |
| 3.0 | isopropyl palmitate |
| 0.1 | calendula oil |

The lotion composition was added to each of the following tissues at an add on rate of 15% based on the weight of the tissue.

Example 1 (Control)

A 3 ply lotion treated tissue having a basis weight of 40.5 gsm, which was embossed without heat after lotion treatment, was found to possess a % area of 8.5%, a GL pixel count percentage of 0.0% (for GL range 24–32), and BB value of 101.7. The crimp strength of this tissue was 1.94 g. The translucence of the tissue's embossing pattern and bond points was very poor, and the tissue yielded a very low crimp strength.

Example 2 (Control)

A commercially made lotion 4 ply hanks tissue having a basis weight of 48 gsm, which was embossed without heat after lotion treatment, was characterized using IA techniques and was to possess a % area of 5.72, a GL pixel count percentage of 0.0 (for GL range 24–32), and a BB value of 99. The crimp strength of this tissue was 2.2 g. There was no translucency of the tissue's embossing pattern and bond points were very poor. This tissue yielded a very low crimp strength.

Example 3 (Control)

A commercially made lotion 3 ply hanks tissue having a basis weight of 40.5 gsm, which was embossed without heat after lotion treatment, was characterized using IA techniques and was found to possess a % area of 12.3%, a GL pixel count percentage of 0.02% (for GL range 24–32), and a BB value of 81.2. The crimp strength of this tissue was 7.74 g. The translucence of the tissue's embossing pattern and bond points were very poor. The tissue yielded relatively low crimp strength.

Example 4

A 3 ply lotion tissue having a basis weight of 40.5 gsm, which was hot embossed at 91° C./196° F. after lotion application, was characterized via IA techniques and was found to possess a % area of 12.0%, a GL pixel count percentage of 4.38% (for GL range 24–32), and a BB value of 67.5. The tissue's crimp strength was 13.1 g. This tissue possessed bond points with noticeable translucence, and the crimp strength was significantly higher than those found in Examples 1 and 2.

Example 5

A 3 ply lotion tissue having a basis weight of 40.5 gsm, which was hot embossed at 85° C./185° F. after lotion application, was characterized via IA techniques and was found to possess a % area of 12.8%, a GL pixel count percentage of 10.4% (for GL range 24–32), and a BB value of 40.3. The tissue's crimp strength was 40.5 g. This tissue possessed bond points with very prominent translucence qualities, and the crimp strength was the highest of all example tissues analyzed.

Example 6

A 3 ply lotion tissue having a basis weight of 40.5 gsm, which was hot embossed at 105° C./220° F. after lotion application, was characterized via IA techniques and was found to possess a t area of 12, a GL pixel count percentage of 1.22 (for GL range 24–32), and a BB of 40.8. However, the tissue's crimp strength was 2.32g. This is an example of the negative effects of excessive temperature on (depending on number of plies, lotion composition and web speed) ply bonding.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A multi-ply tissue product, comprising a plurality of tissue plies bonded together at bond regions; an additive composition disposed on at least one of the plurality of tissue plies in a deposition region, the additive composition comprising a material selected from the group consisting of a silicone, a wax and mixtures thereof, the bond regions being disposed within the deposition region, the bond regions comprising regions where the tissue plies and additive composition are compressed together, the additive composition being intermingled with the plies and thus serving to increase the bond strength of the bond regions; and the tissue product having a ply bonding value of about 13 grams or greater.

2. The tissue product of claim 1, having a ply bonding value of about 15 grams or greater.

3. The tissue product of claim 1, having a ply bonding value of about 25 grams or greater.

4. The tissue product of claim 1, having a ply bonding value of about 35 grams or greater.

5. The tissue product of claim 1, wherein the tissue product has a basis weight of between about 2 grams per square meter (gsm) to about 65 gsm.

6. The tissue product of claim 1, wherein the tissue plies consists essentially of cellulosic fibers.

7. The tissue product of claim 1, wherein the tissue product consists of two (2) plies.

8. The tissue product of claim 1, wherein the tissue product consists of three (3) plies.

9. The tissue product of claim 1, wherein the tissue product consists of four (4) plies.

10. The tissue product of claim 1, wherein the additive composition covers at least 90% of the surface area of at least one of the tissue plies.

11. The tissue product of claim 1, wherein the additive composition comprises a silicone compound.

12. The tissue product of claim 1, wherein the additive composition comprises from about 30 to about 90 weight percent oil and from about 10 to about 40 weight percent wax.

13. The tissue product of claim 12, wherein the additive composition further comprises from about 5 to about 40 weight percent of a fatty alcohol.

14. The tissue product of claim 12, wherein the amount of oil in the composition is from about 40 to about 70 weight percent.

15. The tissue product of claim 12, wherein the amount of wax in the composition is from about 10 to about 30 weight percent.

16. The tissue product of claim 1, wherein the additive composition has an add-on level of from about 0.5 to about 30 weight percent.

17. The tissue product of claim 1, wherein said bond regions comprise areas where the tissue plies have been compressed together, said additive composition holding said tissue plies together at said bond regions.

18. The tissue product of claim 1, wherein the bond regions comprise embossed regions.

19. The tissue product of claim 1, wherein the additive composition is applied to an outside surface of the tissue product.

20. A multi-ply tissue product comprising:

a plurality of tissue plies;

an additive composition disposed on at least one outer surface of the tissue product to form a deposition region on the product; and wherein the plurality of tissue plies and additive composition are compressed together in the deposition region, the plurality of tissue plies and additive composition forming bond regions where the plies have been compressed, the additive composition intermingling with the plies and serving to hold the plies together within the bond regions.

21. The multi-ply tissue product of claim 20, wherein the tissue product has a ply bonding value of at least about 13 grams.

22. The multi-ply tissue product of claim 20, wherein the tissue product has a ply bonding value of at least about 25 grams.

23. The multi-ply tissue product of claim 20, wherein the bond regions comprise an embossed area defining a decorative pattern.

24. The multi-ply tissue product of claim 20, wherein the tissue product has a basis weight of between about 2 grams per square meter (gsm) to about 65 gsm.

25. The multi-ply tissue product of claim 20, wherein the tissue plies consists essentially of cellulosic fibers.

26. The multi-ply tissue product of claim 20, wherein the tissue product consists of two (2) plies.

27. The multi-ply tissue product of claim 20, wherein the additive composition covers at least 90% of the surface area of at least one of the tissue plies.

28. The multi-ply tissue product of claim 20, wherein the additive composition comprises a silicone compound.

29. The multi-ply tissue product of claim 20, wherein the additive composition comprises from about 30 to about 90 weight percent oil and from about 10 to about 40 weight percent wax.

30. The multi-ply tissue product of claim 29, wherein the additive composition further comprises from about s to about 40 weight percent of a fatty alcohol.

31. The multi-ply tissue product of claim 29, wherein the amount of oil in the composition is from about 40 to about 70 weight percent.

32. The multi-ply tissue product of claim 29, wherein the amount of wax in the composition is from about 10 to about 30 weight percent.

33. The multi-ply tissue product of claim 20, wherein the additive composition has an add-on level of from about 0.5 to about 30 weight percent.

34. The multi-ply tissue product of claim 20, wherein the additive composition comprises a wax.

* * * * *